United States Patent [19]

Lorey et al.

[11] Patent Number: 4,995,974

[45] Date of Patent: Feb. 26, 1991

[54] SEPARATOR ELEMENT

[75] Inventors: Manfred Lorey, Gänsgasse 9, D-6456 Langenselbold; Karl Pötz, Oberursel, both of Fed. Rep. of Germany

[73] Assignee: Manfred Lorey, Langenselbold, Fed. Rep. of Germany

[21] Appl. No.: 334,043

[22] Filed: Apr. 5, 1989

[30] Foreign Application Priority Data

Apr. 6, 1988 [DE] Fed. Rep. of Germany ....... 3811441

[51] Int. Cl.$^5$ .............................................. B01D 29/15
[52] U.S. Cl. .................................... 210/247; 210/315; 210/321.87
[58] Field of Search ............... 210/247, 315, 307, 310, 210/321.87

[56] References Cited

U.S. PATENT DOCUMENTS 3,223,244 12/1965 Topol et al. ......................... 210/247
4,160,684 7/1979 Berger et al. .................... 210/315 X Primary Examiner—Frank Spear
Attorney, Agent, or Firm—Henderson & Sturm

[57] ABSTRACT

A separator element (10) is described, which includes on the side of the incoming flow, before the first hydrophobic filter layer (38) consisting of a microporous membrane with a mean pore size of approximately 15 microns, an outer second hydrophobic filter layer (40) with a mean pore size of approximately 50 microns. With the aid of the second filter layer (40), the larger water drops are first separated from a fluid mixture to be cleaned. The residual small water drops are fully retained at the inner first filter layer (38) and in the sedimentation area (48) they are discharged into the space of the incoming flow.

13 Claims, 3 Drawing Sheets

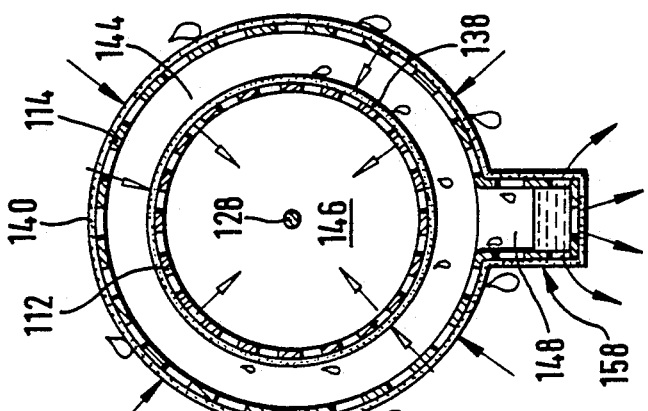
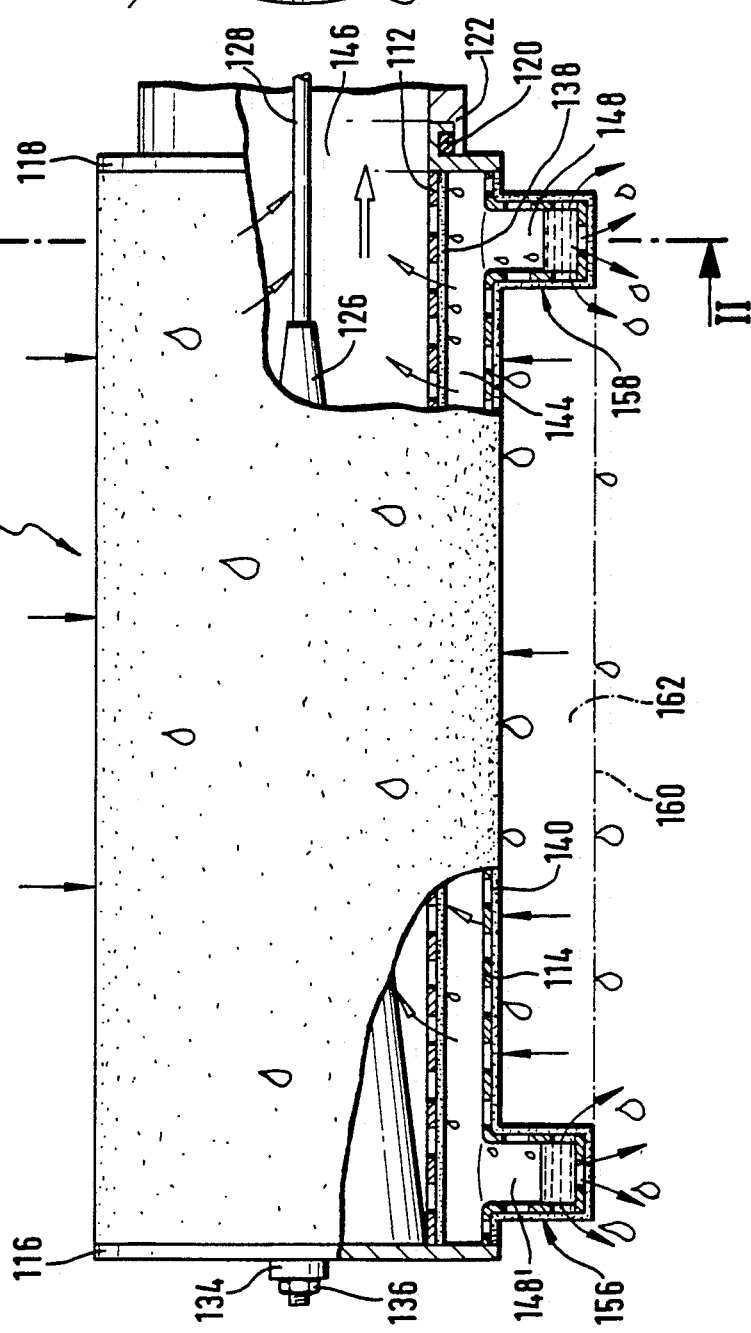

SEPARATOR ELEMENT

BACKGROUND OF THE INVENTION

1. Field of the Invention

The present invention refers to a separator element for use in a device for separating water and contaminants from fluids, comprising a hollow filter body, which is adapted to be arranged within a coalescence element of said device, which is provided with a first hydrophobic filter layer surrounding an inner flow chamber, and which, when installed in said device, is surrounded by an outer flow chamber around which the coalescence element is arranged, one end face of the filter body being closed and the other end face being provided with a flow opening.

2. Description of the Prior Art

Separator elements are used for removing from fluids, in particular from liquids and gases, such as aviation fuels and natural gases, water and contaminants.

The permit for known separator elements is normally limited to a structural design adapted to be used for a specific API class, i.e. the respective separator element can only be used within a predetermined range. For example, separator elements used in mobile fields have to remove 0.5% by weight of water, separator elements used in stationary fields have to remove 3% by weight of water and separator elements used in process fields have to remove 10% by weight of water from liquids which are virtually immiscible with water, or rather they have to reduce the water content of such liquids. However, none of the separator elements used in process fields or in stationary fields reaches the separating accuracy of the elements used in mobile fields. Up to now, it has been absolutely impossible to use separator elements in fields with highly alternating loads.

A separator element of the type mentioned at the beginning is known from EP 60 106 B1. This publication describes in detail a separator element in the form of a surface tension separator arranged within a device for separating water and contaminants from fluids. This separator is supposed to provide the possibility of separating — after several separations of larger particles of water — perhaps still existing finer particles of water from the fluid, said water particles being then discharged through a central opening into the bottom area of a container surrounding the separator.

However, devices for separating water and contaminants from fluids should fulfill the demand that water separation should be guaranteed also in the case of extreme alternating loads, i.e., constantly varying amounts of water, so that the perfect function of the units following said devices is not impaired for achieving thus optimum rates of utilization, economic efficiency and functional reliability.

The hitherto known filter elements endeavor to keep water separation constant in the case of different water rates, but it is often impossible to fulfill this demand in the case of varying loads and in particular in the case of extreme loads.

As will especially be evident from FIG. 1 of EP 60 106 B1, the known device tries to solve this problem by enlarging the distance between a coalescence element and the separator element for achieving thus a high sedimentation of the water droplets. However, a satisfactory result cannot be achieved in the case of varying water loads.

Moreover, the device known from EP 60 106 B1 is additionally provided with guide and deflection means, which are, however, also unable to produce the desired effect.

Nor can the desired success be achieved by means of preceding filters and/or cyclones in this connection.

Furthermore, flow elements in the form of irregularly perforated tubes (DE-A-1 645 749 or DE-A-3 145 964) were installed in separator elements, and although it was thus possible to achieve a more uniform surface load, it was still not possible to obtain the desired separating performance in the case of varying water loads.

Although the above-mentioned measures increased the flow rate and improved the separation efficiency, there is still the problem that a satisfactory function cannot be guaranteed in the case of alternating loads occurring, on the one hand, as very small amounts of water and/or small or minute water droplets and, on the other hand, as large amounts of water, e.g., water contents which suddenly increase rapidly by a factor of 10 to 100 and more than that in comparison with the previously adjusted water load.

An additional problem is that, although it is possible to remove by means of the conventional separator elements a very high percentage of large amounts of water from the liquids to be treated, it is still not possible to fully separate such large amounts of water. For example, a 97 to 98% removal of water from liquids, which is a common percentage in process fields, will not under any circumstances be sufficient for using the thus purified liquids e.g., in the field of aircraft refueling.

SUMMARY OF THE INVENTION

Hence, the present invention is based on the task of further developing a separator element in such a way that a uniform separation efficiency is guaranteed also in the case of extreme and rapidly alternating water loads.

This task is solved by means of a separator element for use in a device for separating water and contaminants from fluids, comprising a hollow filter body, which is adapted to be arranged within a coalescence element of said device, which is provided with a first hydrophobic filter layer surrounding an inner flow chamber, and which, when installed in said device, is surrounded by an outer flow chamber around which the coalescence element is arranged, one end face of the filter body being closed and the other end face being provided with a flow opening, wherein said first filter layer is preceded, on the side of the incoming flow, by at least one second hydrophobic filter layer, and wherein an interspace is defined between said filter layers.

The separator element according to the invention is now adapted to be used for removing not only very small amounts of water, e.g. 100 ppm, but also very high percentages of water of 3% and more than that in such a way that non-dissolved water can no longer be detected in the filtered liquid. Accordingly, the separator element according to the invention provides a universal filter element by means of which in particular high water loads and contaminants occurring all of a sudden can be eliminated without any problems.

The filter layers according to the invention can have the same mean pore size and the same differential pressure, which will occur between the inner chamber and the outer chamber when the aviation fuel flows through. Preferably, however, the mean pore size of the first filter layer will be smaller than that of the second filter layer and, normally, it will be between 1:2 and 1:5, preferably approximately 1:3.

The mean pore size of the two filter layers normally depends on the intended use. The mean pore size of the first filter layer, for example, lies between 1 and 40, preferably between 5 and 25 microns, especially when aviation fuels are cleaned, whereas that of the second filter layer lies between 30 and 80, preferably 40 and 60, especially around approximately 50 microns.

Due to the different screening efficiencies and water-repellant forces, the different layers become effective successively and in a differentiating manner. The outer coarse-pore filter layer separates large water drops thus forming a repellant and protective screen for the inner layer having finer pores and separating the finer water droplets, which passed through the pores of the second filter layer and reached the interspace. The respective separated droplets sink within the outer chamber and the interspace, respectively, downwards, the water droplets contained in the interspace sinking into the sedimentation collecting chamber which is in flow communication with the outer chamber through the pores of the second filter layer. They accumulate up to a predetermined level, which exceeds the hydrophobic effect of the second filter layer, but which is smaller than the hydrophobic effect of the inner layer having finer pores. It follows that, due to this hydrostatic pressure, the differential pressure at the second filter layer is counterbalanced and finally overcome so that the accumulated water droplets will flow, in a direction opposite to the normal direction of flow, through the second filter layer towards the outside where they will combine with the water droplets of the outer chamber and sink into the sump. It will be advantageous when said sedimentation collecting chamber has provided therein, in the area of said first filter layer, a flow-blocking layer at least up to the level of the accumulating water layer, whereby a strike-through of water from the interspace into the inner hollow space is reliably prevented.

The second filter layer consists of a hydrophobic material, preferably of a membrane-like material or a textile fabric, preferably a woven fabric, which has the above-mentioned pore size and which, in particular, has a very low differential pressure, e.g. between 2 and 4 cm column of liquid.

The first membrane layer, however, consists of a hydrophobic filter membrane. It is composed of a microporous structure and normally it is made of PTFE or of a silicone caoutchouc or of a metallic cloth coated therewith.

Due to the microporous structure, the differential pressure of the first filter layer is much higher than that of the second filter layer, said differential pressure of the first filter layer being approximately 100-400 cm column of liquid (approximately 0.1-0.4 bar).

The element according to the invention is not limited to the provision of only two layers. On the contrary, several layers, which are arranged one after the other, can be provided, the layers being respectively provided with a pore structure of increasing fineness in the direction of the flow. It is in so far possible to achieve — if necessary — further gradation of water separation. However — as has already been explained hereinbefore — the provision of two layers will normally be sufficient for reliably covering an additional separation range, since the individual layers complement and shield each other successively and in a differentiating manner.

The coordination of the individual layers can be adapted to the respective operating conditions. The outer layer, for example, is so constructed as to be replaceable end, in the case of damage, it can be exchanged or also replaced by a layer having coarser pores or by a layer having finer pores.

Due to the fact that the individual layers cooperate in a coordinated and differentiating manner, a nonuniform and unsatisfactory water separation in the case of the alternating loads which cannot be avoided in practice, in particular under field conditions in the military sphere (rain water, ground-water, etc.), is practically excluded.

An additional fact is that the whole arrangement can be provided with a redundantly safe structural design, since the two layers cooperate. On the one hand, the outer filter layer having coarser pores protects the inner layer which has finer pores. On the other hand, the inner layer is a reliable monitor, when the outer layer permits — for some reason or other (damage, application of too much water) — an excessive amount of water to pass, since its differential pressure increases rapidly when between 200 and 500 ppm of water is applied or in response to contaminants. In so far, it is possible to release an alarm by determining the differential pressure of the first filter layer and by monitoring this pressure, and this alarm can be used for bringing the whole device to a standstill. It follows that, in so far, a nonperfect operation of the preceding coalescence element, which may, for example, cause passage of dirt or water, can normally be detected in a reliable manner while the refueling operation is still being carried out. Also the last-mentioned arrangement represents a preferred embodiment of the present invention.

The separator element according to the invention permits an automatically compensating and complementary cooperation of the individual layers in direct relation to the load and without any noticeable delay.

The separator element according to the invention is preferably used for vertical installation and for a flow passing from the outside towards the inside. It is, however, not limited to this type of use. It is just as well possible that the flow passes from the inside towards the outside and that the separator element is installed horizontally.

The present invention shall be explained in detail on the basis of embodiments and with reference to the drawings.

BRIEF DESCRIPTION OF THE DRAWINGS

FIG. 3 shows a view of a horizontal embodiment of the separator device with broken-out sections;

FIG. 4 shows a cross-section through the embodiment according to FIG. 3 along the line II—II;

DETAILED DESCRIPTION OF THE PREFERRED EMBODIMENTS

Figure 1:
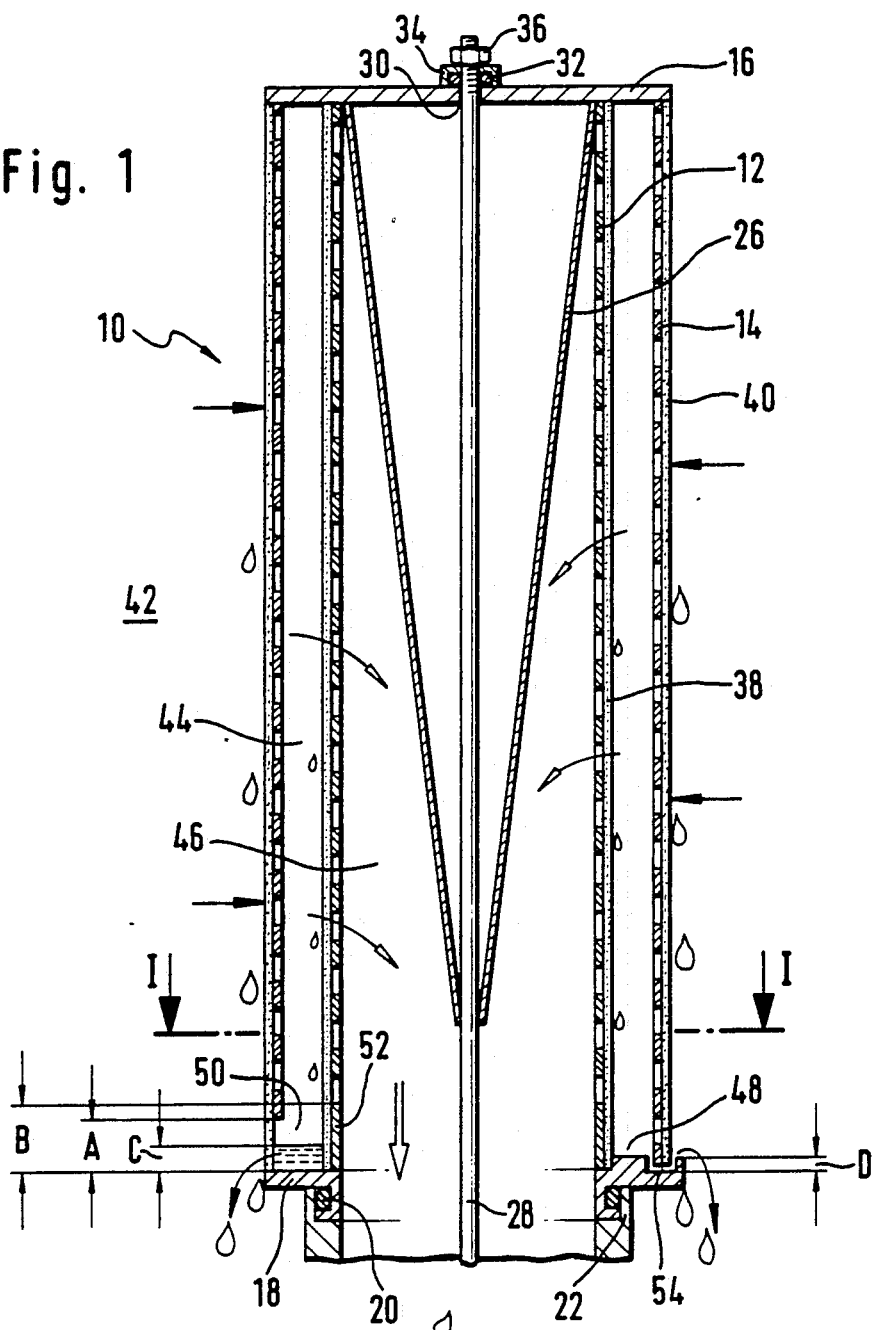
FIG. 1 shows a longitudinal section through a vertical separator device.

In FIG. 1, the separator element for separating contaminants (water) is provided with reference numeral 10. The direction of flow of the fluid to be cleaned is made evident by the arrows included in FIG. 1. The flow is directed from the outside towards the inside, the direction of discharge flow is from the top towards the bottom (vertical arrangement).

The housing of the device as well as the coalescence element preceding the separator element 10 were left out of account in FIG. 1, but they should in an advantageous manner correspond to those of the arrangement described in DE-A 3440506. The separator element 10 essentially comprises the inner support body 12, the outer support body 14, the closure plate 16 attached to one end face of the separator element 10, the reception flange 18 which is arranged at the opposite end and which is provided with an O-ring 20 defining a radial seal against the edge 22 of the outlet opening provided in the housing arrangement.

The separator element should advantageously have provided therein a flow element 26 tapering towards the outlet opening. Such a flow element is described in DE-A 3644489, the disclosure of which is referred to.

For mounting the separator element 10, a spindle 28 is provided, said spindle extending axially through a bore 30, which is provided in the closure plate 16, and through the flow element 26 and being adapted to be anchored in the housing, which is not shown. By means of a seal 32, an intermediate member 34 and a nut 36, which are located at the opposite end of the spindle 28, the separator element 10 can be fixed clearly relative to the housing, which is not shown.

The support bodies 12 and 14 have on their surfaces a plurality of openings so that the fluid to be cleaned can be passed through the support bodies 12 and 14 virtually without any hindrance. They only serve to support the first hydrophobic filter layer 38 and the second hydrophobic filter layer 40. Both filter layers 38 and 40 are arranged on said support bodes 12 and 14 throughout the whole axial length, i.e., from the closure plate 16 to the reception flange 18, without any interspaces being defined between the two end plates. In so far, the liquid to be cleaned or the gas to be cleaned have to flow through both filter layers 38 and 40 for passing from the outer chamber 42 through the interspace 44, which is provided between the two support bodies 12 and 14, into the inner chamber 46.

The interspace 44 should advantageously be constructed as an annular space, provided that the separator element has a tubular, in particular a cylindrical structural design. The latter structural design is, however, not limited to the tubular configuration, but pyramid-shaped or canister-shaped configurations can be used as well.

The first filter layer 38 and the second filter layer 40 consist of the material mentioned at the beginning and have the pore sizes mentioned at the beginning so that reference is made thereto. It will be advantageous when the first filter layer 38 consists of a microporous PTFE membrane having a mean pore size of approximately 15 to 20 microns, whereas the outer second filter layer 40 consists of a PTFE filter cloth having a mean pore size of approximately 50 to 60 microns.

Figure 2:
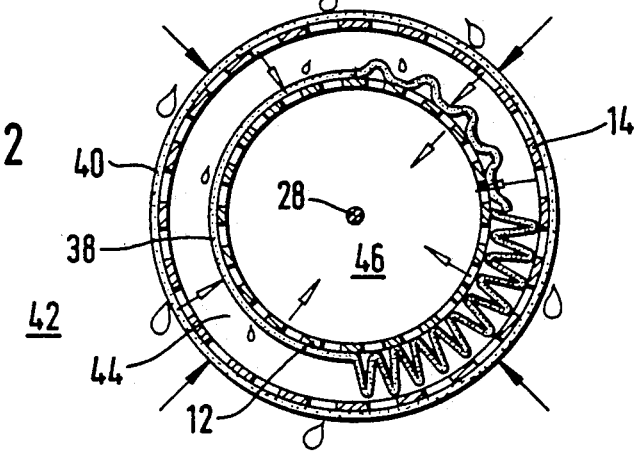
FIG. 2 shows a cross-section through the separator device according to Fig. along line I—I.

FIG. 2 shows the structural design of the first filter layer 38 and that of the second filter layer 40, respectively. The first filter layer 38 can be smooth, or, for the purpose of increasing the separating surface, it can be corrugated or even folded, whereas the second filter layer 40 is provided with a smooth surface; if necessary, also said second filter layer can be corrugated or folded.

According to a first embodiment, which is shown in the left part of FIG. 1, an annular gap 50 is provided in the sedimentation area 48, said annular gap 50 being provided between the outer support body 14 and the reception flange 18, whereby a distance A is formed. It will be advantageous when the inner support body 12 is provided, in the sedimentation area 48, with a flow-blocking element 52 with an axial extension B away from the reception flange 18, the axial distance B being at least equal to the distance A, but normally it will slightly exceed said distance A.

The annular gap 50 is provided so as to facilitate discharge of the sedimented water from the interspace 44. As has already been mentioned hereinbefore, the water will, due to its hydrostatic pressure, rise to approximately a level C — as can be seen in FIG. 1 — and then it will flow off through the pores of the second filter layer 40 due to the hydrostatic pressure. In this connection, the height B of the blocking element 52 prevents the sedimentation water from striking through from the interspace 44 into the inner chamber 46.

In accordance with a second embodiment, which is shown in the right-hand representation of FIG. 1, the reception flange 18 has provided therein an annular groove 54 having a depth D and facing the end face of the outer support body 14, which extends into said annular groove 54 in a contact-free manner thus forming a siphon or a water chamber. In the case of this embodiment, the second filter layer 40 can, in an advantageous manner, extend only up to the end of the outer support body 14 without coming into contact with the reception flange 18. In so far, a flow connection to the outer chamber 42 is provided directly from the interspace 44 through the annular groove 54.

Alternatively, it is also possible to provide an open annular gap between the reception flange 18 and the ends of the support body 14 and of the second filter layer 40, provided that it is guaranteed that the water sedimenting in the outer chamber 42 is not sucked through the defined annular gap into the interspace 44 and from there into the inner chamber 46.

FIG. 1 shows a standing arrangement through which the flow passes from the outside towards the inside. It is, however, also possible to use a suspended arrangement. In this case, the closure plate 16 will be positioned at the location at which the reception flange 18 is provided in accordance with FIG. 1, whereas said reception flange 18 including the O-ring 20 is arranged on the opposite side. It follows that, in the case of the suspended arrangement, the sedimentation area 48 will be located adjacent the closure plate 16.

On the other hand, it is, of course, also possible that the flow passes from the inside towards the outside in the case of both embodiments. In such a case, the filter layers will exchange positions, i.e., the second filter layer 40 will now be located adjacent the inner chamber 46, whereas the first filter layer 38 is arranged adjacent the outer chamber 42. Likewise, the support bodies 12 and 14 will exchange functions in the sedimentation area 48 as far as the annular gap 50, the blocking element 52 or the annular groove 54 are concerned. Hence, the annular gap 50 and the annular groove 54, respectively, will face the inner chamber 46, whereas the blocking element 52 faces the outer chamber 42 in the case of this form-the-inside-towards-the-outside arrangement.

The separator element 10 shown in FIG. 1 and 2 functions in the following way. The fluid to be cleaned, in particular aviation fuel and gases carrying water and other contaminants, is passed through a coalescence element, which is not shown, for the purpose of coalescing, said coalescence element surrounding the separator element 10. Due to the coalescent properties, larger water drops will form, which, after discharge of said fluid from the coalescence element, will already start to run down on the inner side of the element or which will sink down in the interspace between the coalescence element and the separator element 10 in the form of large water drops — as can be seen in FIG. 1. Due to the hydrophobic blocking effect of the second filter layer, these large water drops are prevented from acting on the first filter layer 38. Hence, the major part of the coalesced water drops will already be separated in the outer chamber 42 due to the separating effect of the second filter layer 40. The rest of smaller water drops, which passed the second filter layer 40, is now separated at the surface of the first filter layer 38. These water drops — shown as smaller water drops in FIG. 1 — will sediment within the interspace 44 into the sedimentation area 48, and, due to their own weight, they will be discharged through the annular gap 50 and the annular groove 54, respectively, into the outer chamber 42. The term "outer chamber" is, in accordance with the present invention, synonymous with the supply chamber from which the liquid to be separated is supplied to the separator element 10. This separator device 10 can thus be used for cleaning aviation fuel, which contains alternately 3% by weight of water and more than that and/or minute percentages of water of 0.01%. in such a way that free water can no longer be detected in the purified aviation fuel. This could be proved by means of the conventional water detection devices during the test runs (SHELL WATER DETECTOR of the firm of Shell).

FIG. 3 and 4 show an additional embodiment of a separator element 100, which has a structural design suitable for horizontal installation and through which the flow passes from the outside towards the inside in accordance with the arrows shown in FIG. 3 and 4.

This embodiment corresponds, in principle, to the embodiment according to FIG. 1 and 2. The reference numerals of this embodiment are only modified by the index 1 in comparison with the embodiment shown in FIG. 1 and 2. Apart from that the individual parts correspond to one another with regard to their functions.

Due to the vertical construction, the embodiment shown in FIG. 3 and 4 is modified in the sedimentation area 148. According to the representation of FIG. 3, two water pockets 156 and 158, respectively, are provided adjacent the closure plate 116 and the reception flange 118, said water pockets being respectively provided on the outer support body 114. These water pockets 156, 158 or recesses in the outer support body 114 have the same lattice-shaped structure as the support bodies 112, 114, i.e., the liquids to be treated can pass therethrough on the basis of an extremely small pressure difference. The second filter layer 140 is put round these water pockets and covers them fully. The depth of the water pockets is such that it exceeds the column of fluid within the water pocket, which is necessary for effecting a discharge of the accumulated liquid (water) into the outer chamber. FIG. 4 shows, by way of example, the water level within the water pockets 156, 158, the incoming water drops as well as the amount of water flowing from the water pocket into the outer chamber 142.

In the case of an additional embodiment, a continuous groove, which is indicated by the broken line 160, is provided instead of these two water pockets. The collected water can here flow off to the outside through the groove space 162. This groove provided over the whole length of the separator element 100 and the two water pockets 156, 158 both serve to remove the water.

Figure 5:
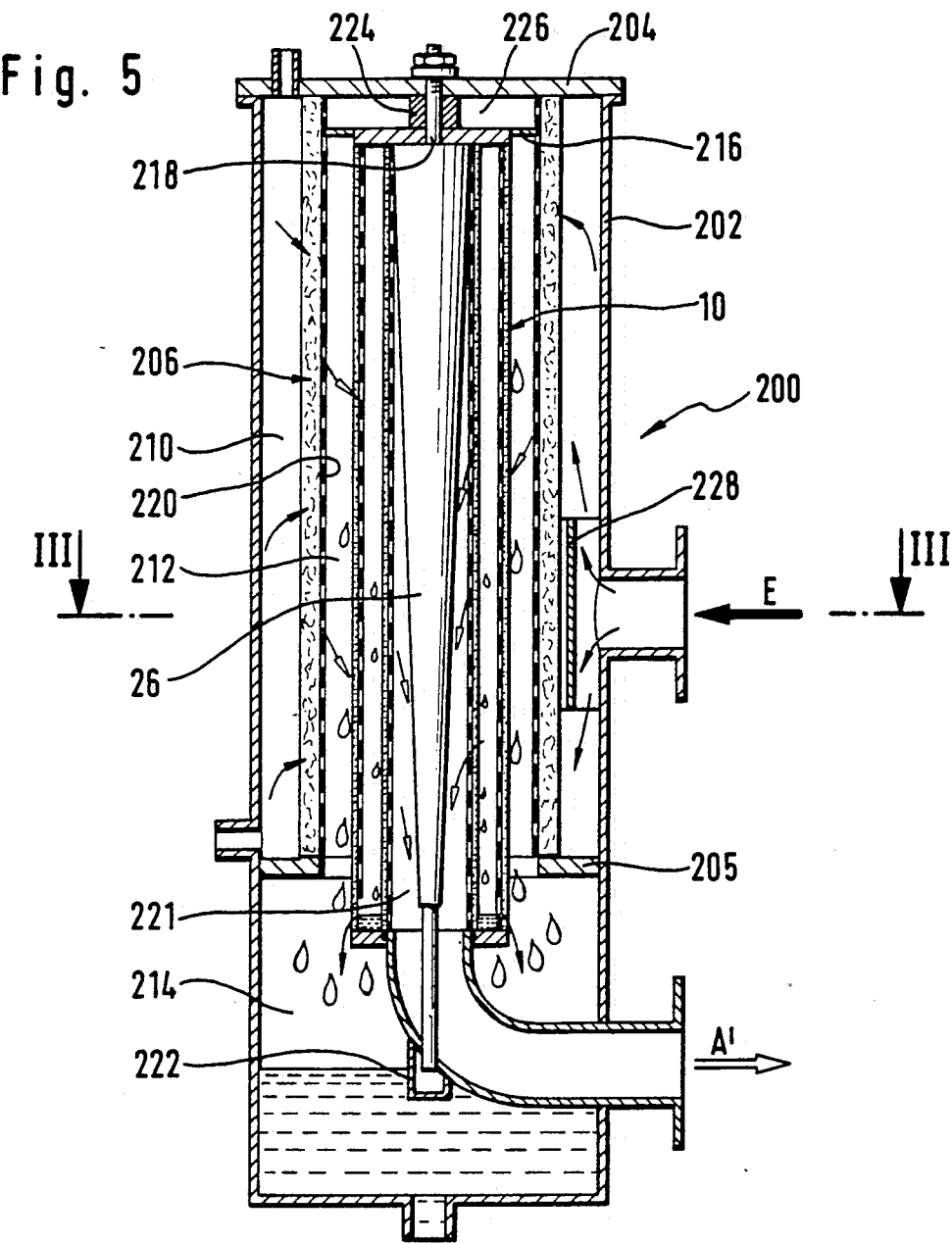
FIG. 5 shows a schematic representation of an embodiment of a filter water separator in a longitudinal section.
Figure 6:
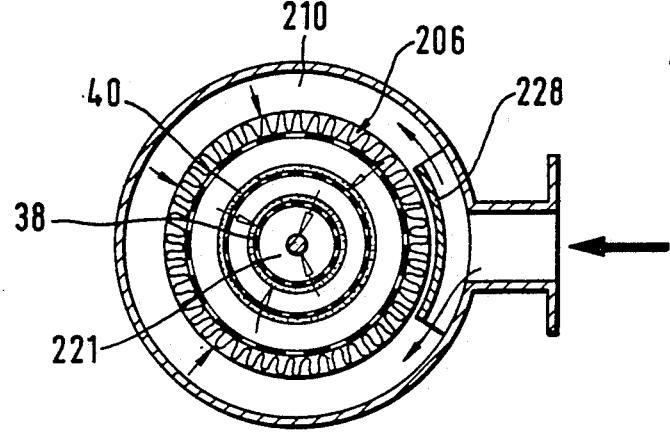
FIG. 6 shows a cross-section through the embodiment according to FIG. 5 along the line III—III.

FIG. 5 and 6 show a separator element which is installed in a filter water separator 200. In the case of the representations according to FIG. 5 and 6, reference is explicitly made to the embodiment according to FIG. 1 and the associated description of DE-A 3440506, the disclosure of which is herewith explicitly referred to. In so far, the present description contains only the essential features.

FIG. 5 and 6 show a filter water separator 200 according to DE-A 3440506, which has had installed therein a separator element 10 according to the present invention. This filter water separator 200 is provided with a housing 202. Said housing is, when installed, open at the top and can be closed with the aid of the cover 204. The housing is provided with an inlet E and with an outlet A arranged below said inlet, the longitudinal axes of said inlet and of said outlet extending at right angles to the longitudinal axis of the housing and said outlet A being curved within the housing 202.

A coalescence element 206 is fixed in position within the housing 202 between the cover 204 and an annular flange 205 attached to the inner wall of the housing, said coalescence element defining between its outer surface and the housing 202 an outer flow chamber 210, which communicates directly with the inlet E, i.e., which defines a supply chamber for the fluid to be treated.

In the interior of the coalescence element 206 the separator element 10 is provided so that an annular middle flow chamber 212 is defined. This middle flow chamber 212 is defined. This middle flow chamber 212 is delimited by a protection and guide lattice 220 on the outside thereof, the coalescence element 206 being arranged on said lattice 220.

Furthermore, the second element unit, i.e., the separator element 10, is arranged coaxially with the longitudinal axis of the coalescence element 206, the lower end of said separator element being fixedly connected with a tube leading to the outlet A, said lower end opening into said tube.

As has already been stated hereinbefore, the outside diameter of the separator element 10 is smaller than the interior diameter of the coalescence element 206 so that the middle flow chamber 212 is defined between these two diameters, said middle flow chamber being in flow-communication with the fluid collecting chamber 214 formed in the bottom of the housing 202.

The upper side of the separator element 10 is closed by a centering plate 216, which corresponds to the closure plate 16 according to FIG. 1. A spindle 218 passes through the centering plate 216 and the plate 204, said spindle extending through said plates as well as through the inner flow chamber 221 and the flow element 26 into the outlet A where it is secured in position in a hub 222 which is connected with the outlet tube. A spacer ring 224 is arranged on said spindle 218 in such a way that an annular space 226 is formed around said spacerring, said annular space 226 being provided between the cover 204 and the centering plate 216. By means of this annular space 226 the separator element 10 is advantageously displaced downwards relative to the coalescence element 206.

Furthermore, it will be advantageous when the housing 202 has on the inner surface thereof in the area of the inlet E a deflector 228 by means of which the incoming fluid is deflected sidewards as well as upwards and downwards.

The mode of operation of this device 200 corresponds to that of the device according to German-pat. No. 4340506, i.e., the fluid to be cleaned is supplied through the inlet E and in the area of the deflector 228 it is uniformly distributed over the whole coalescence element 206. When the fluid flows through the coalescence element 206, coalescence of the free water in the fluid takes place. The major part of the water drops formed will sink within the middle flow chamber 212 and from said middle flow chamber they will fall into the fluid collecting chamber 214, which has on the underside thereof an outlet for removing the water. The coarse water drops will be separated from the fine water drops to a large extent by means of the second filter layer 40 of the separator element 10. The residual fine water droplets will be separated by the first filter layer 38 and, at the lower end of the separator element, they will pass the second filter layer and fall into the fluid collecting chamber 214, as has been described hereinbefore in connection with the embodiment according to FIG. 1 and 2.

It follows that the separator element 10 effects a successive separation of fluids, especially water, said separation being differentiated in accordance with the respective load applied.

We claim:

1. A separator element for use in a device for separating water and contaminants from fluids, wherein said device includes a coalescing element, comprising a hollow filter body arranged within the coalescing element and having a first hydrophobic filter layer surrounding an inner flow chamber, said layer being spaced from and surrounded by the coalescing element to provide an outer flow chamber, one end face of the filter body being closed and the other end thereof being provided with a flow opening, a second hydrophobic filter layer upstream of the first filter layer as respects incoming flow, and said filter layers being arranged to provide an interspace between them.

2. A separator element according to claim 1 wherein the first filter layer and the second filter layer are respectively provided on an inner support body and on an outer support body, and wherein the whole arrangement has a cylindrical structural design.

3. A separator element according to claim 1 or 2, wherein the mean pore size of the second filter layer in relation to that of the first filter layer is between 2:1 and 5:1, preferably approximately 3:1.

4. A separator element according to claim 1 or 2, wherein the mean pore size of the first filter layer is between 1 and 40, between 5 and 25 microns, and the mean pore size of the second filter layer is between 30 and 80, preferably between 40 and 60, in particular approximately 50 microns.

5. A separator element according to claim 1, wherein the differential pressure of the first filter layer lies between approximately 100 to 400 cm column of liquid and that of the second filter layer lies between 2 to 4 cm column of liquid.

6. A separator element according to claim 1 wherein the material for the first and for the second filter layers is PTFF or silicone caoutchouc or materials coated therewith.

7. A separator element according to claim 1 wherein the first filter layer consists of a microporous membrane having a mean pore size of approximately 15 microns and the second filter layer consists of a woven fabric having a mean pore size of approximately 50 microns, the ratio of the two differential pressures being between 50 and 100.

8. A separator element according to claim 1 wherein the interspace area has provided therein means for discharging water from the interspace into the space of the incoming flow.

9. A separator element according to claim 8, wherein said means for discharging water comprise an annular gap between a reception flange and the end face of the outer support body as well as a blocking element, which, extending away from the reception flange in an annular configuration, encloses the inner support body and prevents sedimented water from flowing off into the inner chamber.

10. A separator element according to claim 9, wherein the height of the blocking element is equal to or greater than the height of the annular gap.

11. A separator element according to claim 8, wherein said means for discharging water includes an annular groove, which is provided in the reception flange or in the closure plate and into which the outer support body extends forming thus a siphon.

12. A separator element according to claim 8, wherein, in the case of a vertical construction of the separator element, the means for discharging water includes at least one water pocket, which extends away from the outer support body and which is also surrounded by the second filter layer, the depth of said at least one water pocket exceeding the column of fluid which is necessary for discharging collected sedimented water into the space of the incoming flow.

13. A separator element according to claim 12, wherein the water pocket extends in the form of a groove axially along the whole outer surface of the separator element.

* * * * *